United States Patent
Soon (10) Patent No.: US 9,821,487 B1
(45) Date of Patent: Nov. 21, 2017

(54) COMBINATION HOLE PUNCH AND ELECTRONIC DEVICE STAND

(71) Applicant: Min Tet Soon, Sabah (MY)

(72) Inventor: Min Tet Soon, Sabah (MY)

( * ) Notice: Subject to any disclaimer, the term of this patent is extended or adjusted under 35 U.S.C. 154(b) by 0 days.

(21) Appl. No.: 15/014,659

(22) Filed: Feb. 3, 2016

(51) Int. Cl.
| B26F 1/14 | (2006.01) |
| B26F 1/36 | (2006.01) |
| B26F 1/02 | (2006.01) |
| B26D 7/00 | (2006.01) |

(52) U.S. Cl.
CPC ............... B26F 1/36 (2013.01); B26F 1/02 (2013.01); *B26D 2007/0018* (2013.01); *Y10T 83/943* (2015.04)

(58) Field of Classification Search
CPC ... F16B 2/20; F16B 2/22; F16B 2/243; B26D 7/015; B26D 2007/0028; Y10T 83/883; Y10T 83/943; B26F 1/02; B26F 1/14
USPC ..... 248/452, 447, 222.12; 83/687, 691, 633, 83/634
See application file for complete search history.

(56) References Cited

U.S. PATENT DOCUMENTS

| 2,275,012 | A | * | 3/1942 | Faas | ........................ B26F 1/36 |
| | | | | | 83/588 |
| 5,607,135 | A | | 3/1997 | Yamada | |
| 5,906,448 | A | | 5/1999 | Najmi | |
| D664,141 | S | | 7/2012 | Haymond | |
| 8,218,299 | B2 | | 7/2012 | Yuan | |
| 8,303,126 | B2 | | 11/2012 | Moya, Jr. | |
| 8,347,770 | B2 | | 1/2013 | Cedar et al. | |
| 2010/0224045 | A1 | | 9/2010 | Ishihara et al. | |
| 2013/0026314 | A1 | | 1/2013 | Hu et al. | |
| 2013/0049347 | A1 | | 2/2013 | Bahrami | |

* cited by examiner

*Primary Examiner* — Andrea Wellington
*Assistant Examiner* — Samuel A Davies
(74) *Attorney, Agent, or Firm* — Richard L. Miller (57) ABSTRACT

A double duty hole punch that punches holes in paper and supports a hand-held electronic device thereon. The double duty hole punch includes a base, a handle, a pair of punch dies, and a supporting apparatus. The base rests on a horizontal surface. The handle is pivotally attached to the base. The pair of punch dies are operatively connected to the handle, and punch the holes in the paper. The supporting apparatus supports the hand-held electronic device thereon.

129 Claims, 6 Drawing Sheets

COMBINATION HOLE PUNCH AND ELECTRONIC DEVICE STAND

BACKGROUND OF THE INVENTION

Field of the Invention

The present invention relates to an electronic device stand, and more particularly, a combination hole punch and electronic device stand.

Description of the Prior Art

Numerous innovations for stands have been provided in the prior art that will be described. Even though these innovations may be suitable for the specific individual purposes to which they address, however, they differ from the present invention.

A FIRST EXAMPLE, U.S. Pat. No. 5,607,135, Published/Issued on Mar. 4, 1997, to Yamada teaches a foldable one-piece tablet stand including a base section, a back rest section that can be raised and lowered into the base section, a pair of protrusions that can be raised and lowered into the base and disposed at a front part of the base section so that when both the back rest section and the protrusions are in the raised conditions, a tablet will be held by the back rest section, with a bottom of the tablet held by the base section and secured by the pair of protrusions, and a holder section that is foldable into the base section and hinged on the back of the back rest section and held on parts of the base section so that the back rest section will be fixed thereby.

A SECOND EXAMPLE, U.S. Pat. No. 5,906,448, Published/Issued on May 25, 1999, to Najmi teaches a combination of a paper holder and a paper punch including a base, a paper clip, and a paper punch built into the paper clip. A "U"-shaped steel spring is inserted into depressions in the base and held in place with projections formed in the base and a depression formed in the unit.

A THIRD EXAMPLE, U.S. Pat. No. 8,218,299, Published/Issued on Jul. 10, 2012, to Yuan teaches an electronic device including a body, two clamps, a remote control, a connecting member, and two supports. The two clamps are oppositely fastened to two lateral sides of the body. The remote control is seated between the clamps on a rear side of the body. The connecting member is positioned under the remote control and slidingly connected to the clamps, and configured for carrying the remote control. Each of the supports includes a holder rotatablely connected to one of the two clamps and a bracket extending from the holder towards the body for holding the connecting member.

A FOURTH EXAMPLE, U.S. Pat. No. 8,303,126, Published/Issued on Nov. 6, 2012, to Moya, Jr. teaches a cell phone stand to secure a cell phone or a camera with video recording capability, which includes a plurality of support legs with a plurality of front support legs, a plurality of side support legs and a plurality of back support legs, a cell phone base plate or a camera base plate with a raised perimeter to secure the cell phone or camera that is supported by the support legs. There is also a plurality of rotator cuffs disposed around the base plate to rotate the front support legs and the back support legs under the base plate, a built-in light, and one or more batteries housed in a battery casing to provide electric power to the built-in light.

A FIFTH EXAMPLE, U.S. Pat. No. 8,347,770, Published/Issued on Jan. 8, 2013, to Cedar, et al. teaches a hole punch including a base and a handle assembly to actuate a punch pin. The base may include a housing enclosing a punch head. The housing may include an opening where the handle assembly is adapted to be recessed within the opening. The handle assembly may include a first linkage and a second linkage, each pivotally coupled to the base, and a third linkage pivotally coupled to both the first and second linkages where the third linkage is arranged to move substantially parallel to the base. The first linkage may be substantially parallel to the second linkage when the punch pin is in a rest position, and the second linkage may be configured to nest within the first linkage when the punch pin is in a deployed position.

A SIXTH EXAMPLE, U.S. Patent Office Document No. D664,141, Published/Issued on Jul. 24, 2012, to Haymond teaches the ornamental design for a cellular phone stand for a desk.

A SEVENTH EXAMPLE, U.S. Patent Office Document No. 2010/0224045, Published/Issued on Sep. 9, 2010, to Ishihara, et al. teaches a punch including a punch blade, a guide passage, and a stand that has a flat surface orthogonal to the guide passage. Sheets placed on the stand are perforated by operating a handle. A slit is provided to an upper surface of the stand. A gauge member is slidably inserted into the slit. The stand and the gauge member are made to be flush. The gauge member is provided with a standing portion to which an end portion of the sheets is abutted at one end portion of the gauge member while the gauge member is also provided with a flexible banding member toward the other end portion. The banding member is curved so as to be housed into an interior of the stand.

AN EIGHTH EXAMPLE, U.S. Patent Office Document No. 2013/0026314, Published/Issued on Jan. 31, 2013, to Hu, et al. teaches a supporting apparatus for adapting to a flat electronic device. The supporting apparatus includes a pedestal and a carrying seat movably disposed thereon. The carrying seat includes a main body, a blocking member, and a bearing member. A sliding surface is formed on the main body. The blocking member is disposed on the main body, and a blocking surface is formed on the blocking member facing the sliding surface. The sliding surface and the blocking surface are arranged in gradual convergence. The bearing member is slidably disposed on the sliding surface and is separated from the blocking member. The bearing member is movable along the sliding surface in adjusting the distance between the bearing member and the blocking member. The flat electronic device is clipped fixingly by the bearing member and the blocking member on opposite sides thereof.

A NINTH EXAMPLE, U.S. Patent Office Document No. 2013/0049347, Published/Issued on Feb. 28, 2013, to BAHRAMI teaches a page-prop device including a retaining wall, a base and, in some embodiments, a stabilizing tab that can be used by a user to view a page of bound material in a "hands free" manner. In addition, the angle between the beginning portion of the retaining wall and the beginning portion of the base is selected to ensure that sufficient light is displayed on the page of the bound material that is of interest to the user. Rectangular wedges are used to fix this angle.

It is apparent now that numerous innovations for stands have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a combination hole punch and electronic device stand that avoids the disadvantages of the prior art.

ANOTHER OBJECT of the present invention is to provide a combination hole punch and electronic device stand that is simple and inexpensive to manufacture.

STILL ANOTHER OBJECT of the present invention is to provide a combination hole punch and electronic device stand that is simple to use.

BRIEFLY STATED, STILL YET ANOTHER OBJECT of the present invention is to provide a double duty hole punch that punches holes in paper and supports a hand-held electronic device thereon. The double duty hole punch includes a base, a handle, a pair of punch dies, and a supporting apparatus. The base rests on a horizontal surface. The handle is pivotally attached to the base. The pair of punch dies are operatively connected to the handle, and punch the holes in the paper. The supporting apparatus supports the hand-held electronic device thereon.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING

Introductory 20 double duty hole punch of embodiments of present invention for punching holes in paper and for supporting hand-held electronic device 22 thereon
22 hand-held electronic device Overall Configuration of Double Duty Hole Punch 20

24 base for resting on horizontal surface 32
26 handle
28 pair of punch dies for punching holes in paper
30 supporting apparatus for supporting hand-held electronic device 22
32 horizontal surface Specific Configuration of Base 24

32a pair of pedestals of base 24

Specific Configuration of Handle 26

33 pair of arms of handle 26
34 cross-piece of handle 26
36 pair of proximal ends of pair of arms 32 of handle 26, respectively
38 pair of distal ends of pair of arms 32 of handle 26, respectively Specific Configuration of Pair of Punch Dies 28

40 pair of punch rods of pair of punch dies 28, respectively
42 pair of springs of pair of punch dies 28, respectively Specific Configuration of Supporting Apparatus 30

44 pair of stoppers of supporting apparatus 30 for providing stops for hand-held electronic device 22 when hand-held electronic device 22 rests on handle 26

45 top surfaces of pair of proximal ends 36 of pair of arms 33 of handle 26, respectively

Specific Configuration of First Embodiment of Supporting Apparatus 130

130 supporting apparatus
146 pair of slots of pair of proximal ends 36 of pair of arms 33 of handle 26 of supporting apparatus 130, respectively

Specific Configuration of Each Stopper of Pair of Stoppers 44 of First Embodiment of Supporting Apparatus 130

148 block of each stopper of pair of stoppers 44 of supporting apparatus 130
149 gap of block 148 of each stopper of pair of stoppers 44 of supporting apparatus 130 for receiving sheet of cardboard 149a for supporting larger hand-held electronic device 149b
149a sheet of cardboard 149a for supporting larger hand-held electronic device 149b
149b larger hand-held electronic device
150 bottom surface of block 148 of each stopper of pair of stoppers 44 of supporting apparatus 130
152 top surface of block 148 of each stopper of pair of stoppers 44 of supporting apparatus 130
154 pair of side surfaces of block 148 of each stopper of pair of stoppers 44 of supporting apparatus 130
156 front surface of block 148 of each stopper of pair of stoppers 44 of supporting apparatus 130
158 rear surface of block 148 of each stopper of pair of stoppers 44 of supporting apparatus 130
160 pair of surfaces of gap 149 of block 148 of each stopper of pair of stoppers 44 of supporting apparatus 130
162 first portion of top surface 152 of block 148 of each stopper of pair of stoppers 44 of supporting apparatus 130
164 second portion of top surface 152 of block 148 of each stopper of pair of stoppers 44 of supporting apparatus 130
166 clip of block 148 of each stopper of pair of stoppers 44 of supporting apparatus 130

Specific Configuration of Each Stopper of Pair of Stoppers 44 of Second Embodiment of Supporting Apparatus 230

230 supporting apparatus
248 extension of each stopper of pair of stoppers 44 of supporting apparatus 230
249 gaps of extensions 248 of pair of stoppers 44 of supporting apparatus 230, respectively, for receiving sheet of cardboard 149a for supporting larger hand-held electronic device 149b
250 first portion of extension 248 of each stopper of pair of stoppers 44 of supporting apparatus 230
252 second portion of extension 248 of each stopper of pair of stoppers 44 of supporting apparatus 230
254 third portion of extension 248 of each stopper of pair of stoppers 44 of supporting apparatus 230
266 protective covering of extension 248 of each stopper of pair of stoppers 44 of supporting apparatus 230

DETAILED DESCRIPTION OF THE PREFERRED EMBODIMENT

Introductory

Figure 1:
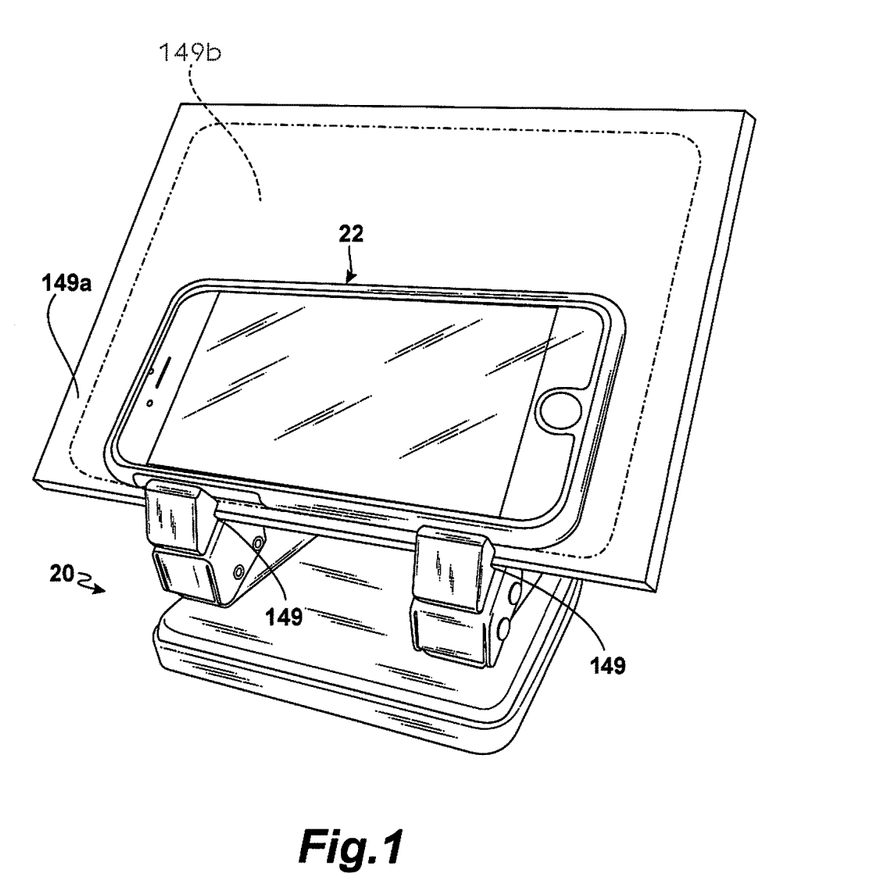
FIG. 1 is a diagrammatic perspective view showing a cell phone or electronic tablet resting on a first embodiment of the combination hole punch and electronic device stand of the embodiments of the present invention.
Figure 2:
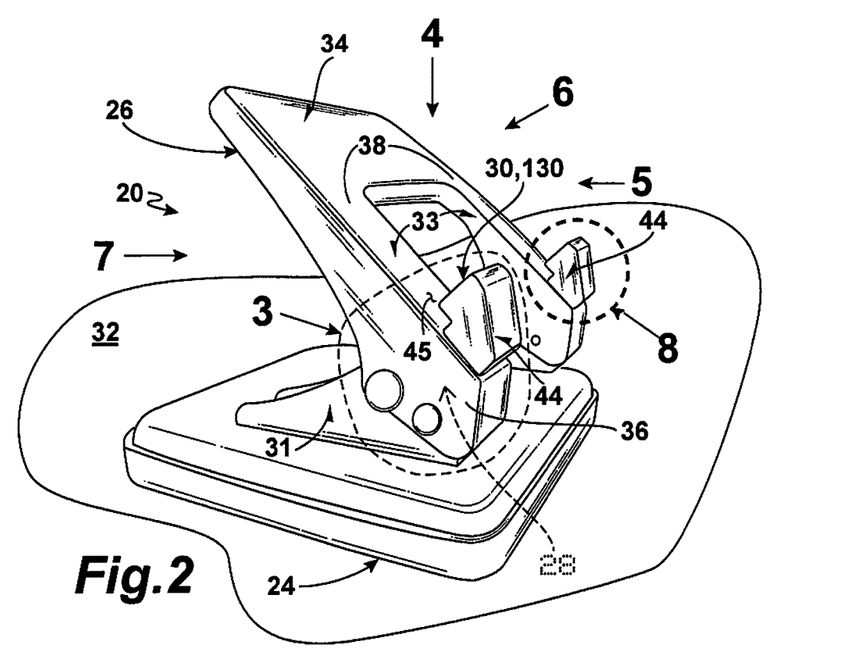
FIG. 2 is another diagrammatic perspective view of the first embodiment of the combination hole punch and electronic device stand of the embodiments of the present invention per se.

Referring now to the figures, in which like numerals indicate like parts, and particularly to FIG. 1, the double duty hole punch of the embodiments of the present invention is shown generally at 20 for punching holes in paper and for supporting a hand-held electronic device 22 thereon.

Overall Configuration of the Double Duty Hole Punch 20

The overall configuration of the double duty hole punch 20 can best be seen in FIGS. 2 and 4-7, and as such, will be discussed with reference thereto.

The double duty hole punch 20 comprises a base 24, a handle 26, a pair of punch dies 28, and a supporting apparatus 30.

The base 24 is for resting on a horizontal surface 32. The handle 26 is pivotally attached to the base 24. The pair of punch dies 28 are operatively connected to the handle 26 and are for punching the holes in the paper. The supporting apparatus is for supporting the hand-held electronic device 22.

Specific Configuration of the Base 24

The specific configuration of the base 24 can best be seen in FIGS. 2 and 4-7, and as such, will be discussed with reference thereto.

The base 24 includes a pair of pedestals 32a.

The pair of pedestals 32a of the base 24 extend upwardly therefrom.

Specific Configuration of the Handle 26

The specific configuration of the handle 26 can best be seen in FIGS. 2 and 4-7, and as such, will be discussed with reference thereto.

The handle 26 is U-shaped, and as such, has a pair of arms 33 and a cross-piece 34.

The pair of arms 33 of the handle 26 have a pair of proximal ends 36, respectively, and a pair of distal ends 38, respectively.

The cross-piece 34 of the handle 26 extends from the distal end 38 of one arm 33 of the handle 26 to the distal end 38 of the other arm 33 of the handle 26.

The pair of proximal ends 36 of the handle 26 are pivotally attached to the pair of pedestals 32a of the base 24, respectively.

Specific Configuration of the Pair of Punch Dies 28

Figure 6:
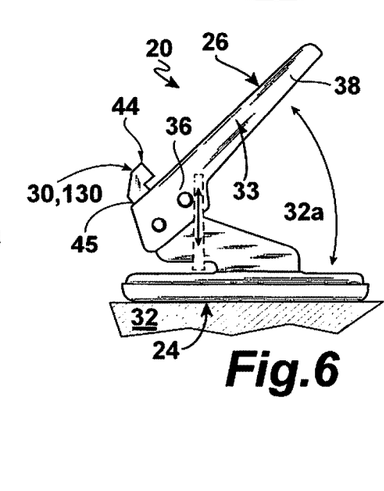
FIG. 6 is a diagrammatic side elevational view of the combination hole punch and electronic device stand of the embodiments of the present invention taken generally in the direction of Arrow 6 in FIG. 2.
Figure 7:
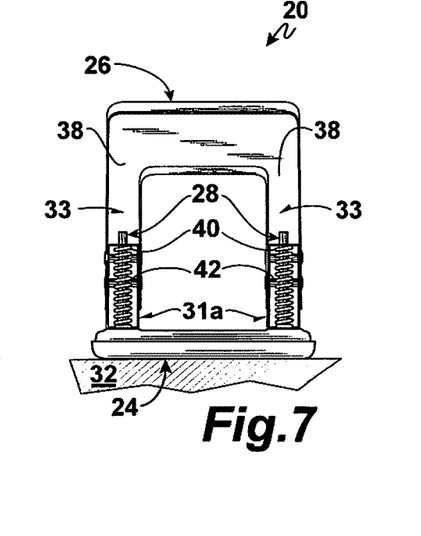
FIG. 7 is a diagrammatic rear elevational view of the combination hole punch and electronic device stand of the embodiments of the present invention taken generally in the direction of Arrow 7 in FIG. 2.
Figure 8:
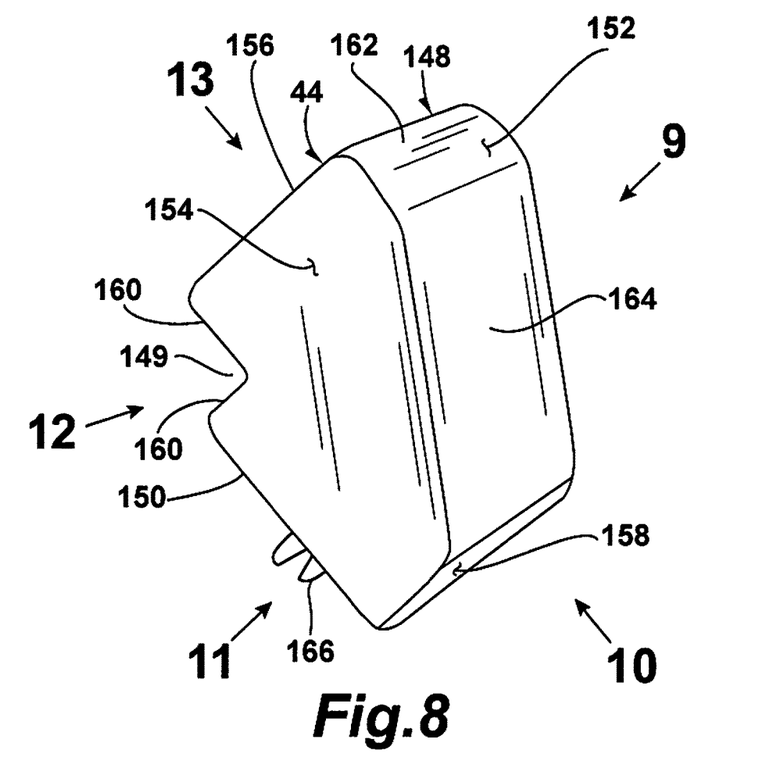
FIG. 8 is an enlarged diagrammatic perspective view of a portion of the combination hole punch and electronic device stand of the embodiments of the present invention of the area generally enclosed by the dotted curve identified by Arrow 8 in FIG. 2.
Figure 9:
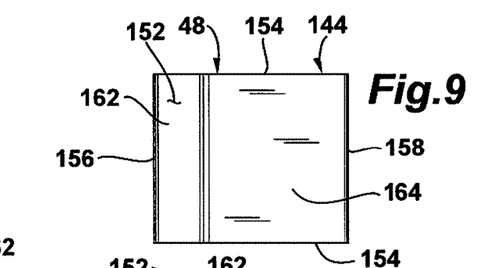
FIG. 9 is a reduced diagrammatic side elevational view of the combination hole punch and electronic device stand of the embodiments of the present invention taken generally in the direction of Arrow 9 in FIG. 8.
Figure 10:
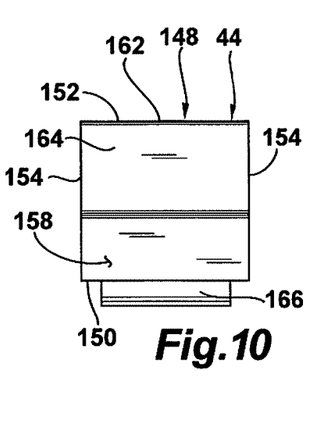
FIG. 10 is a reduced diagrammatic rear elevational view of the combination hole punch and electronic device stand of the embodiments of the present invention taken generally in the direction of Arrow 10 in FIG. 8.
Figure 11:
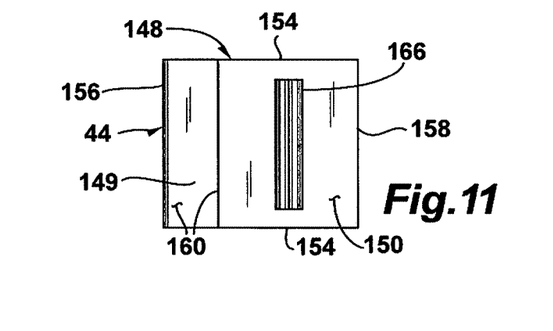
FIG. 11 is a reduced diagrammatic bottom plan view of the combination hole punch and electronic device stand of the embodiments of the present invention taken generally in the direction of Arrow 11 in FIG. 8.
Figure 12:
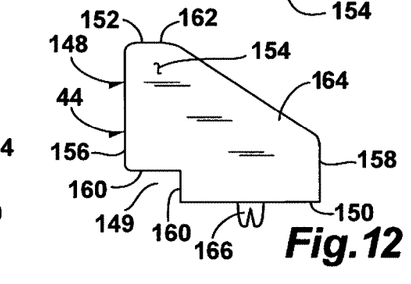
FIG. 12 is a reduced diagrammatic side elevational view of the combination hole punch and electronic device stand of the embodiments of the present invention taken generally in the direction of Arrow 12 in FIG. 8.
Figure 13:
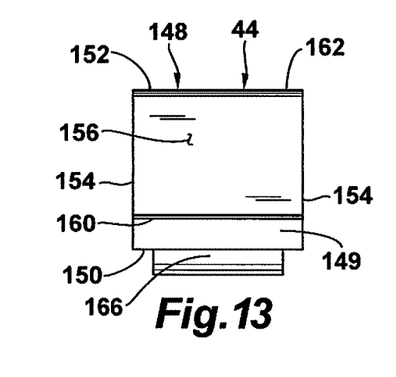
FIG. 13 is a reduced diagrammatic front elevational view of the combination hole punch and electronic device stand of the embodiments of the present invention taken generally in the direction of Arrow 13 in FIG. 8.

The specific configuration of the pair of punch dies 28 can best be seen in FIGS. 6 and 7, and as such, will be discussed with reference thereto.

The pair of punch dies 28 include a pair of punch rods 40, respectively, and a pair of springs 42, respectively.

The pair of springs 42 of the pair of punch dies 28 surround the pair of punch rods 40 of the pair of punch dies 28, respectively, and bias the handle 26 upwardly in a non-punch position, and when the handle 26 is pressed downwardly against biasing of the pair of springs 42 of the pair of punch dies 28 into a punch position, the pair of punch rods 40 of the pair of punch dies 28 are lowered and punch the holes in the paper.

Specific Configuration of the Supporting Apparatus 30

The specific configuration of the apparatus 30 can best be seen in FIGS. 2-7, and as such, will be discussed with reference thereto.

The supporting apparatus 30 includes a pair of stoppers 44.

The pair of stoppers 44 of the supporting apparatus 30 are disposed at top surfaces 45 of the pair of proximal ends 36 of the pair of arms 33 of the handle 26, respectively, and are for providing stops for the hand-held electronic device 22 when the hand-held electronic device 22 rests on the handle 26.

Specific Configuration of a First Embodiment of the Supporting Apparatus 130

The specific configuration of a first embodiment of the supporting apparatus 130 can best be seen in FIGS. 2-7, and as such, will be discussed with reference thereto.

Figure 3:
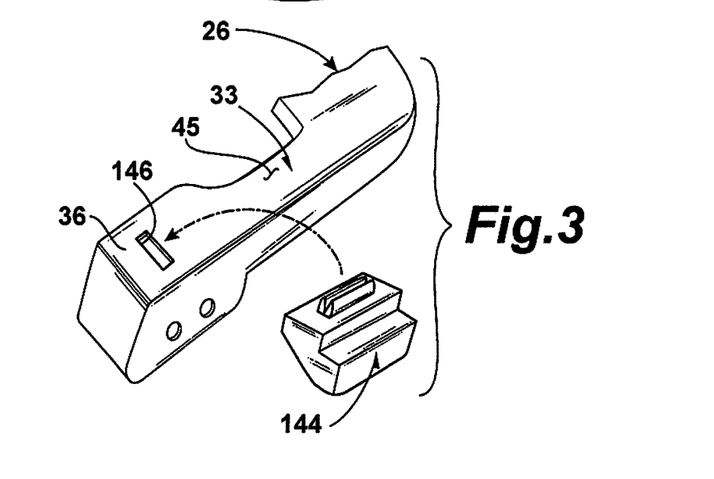
FIG. 3 is an enlarged diagrammatic perspective view showing the cooperation between components of the combination hole punch and electronic device stand of the embodiments of the present invention enclosed in the dotted curve identified by Arrow 3 in FIG. 2.
Figure 4:
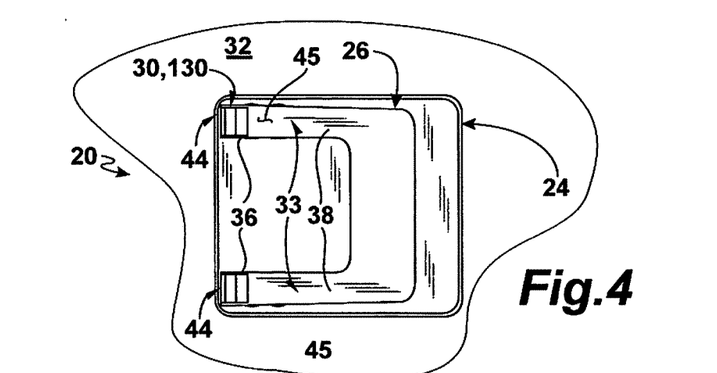
FIG. 4 is a diagrammatic top plan view of the combination hole punch and electronic device stand of the embodiments of the present invention taken generally in the direction of Arrow 4 in FIG. 2.
Figure 5:
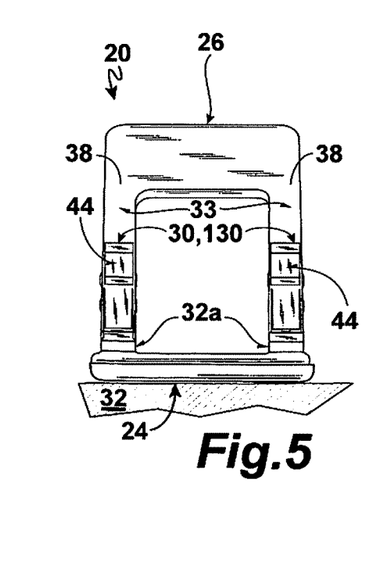
FIG. 5 is a diagrammatic front elevational view of the combination hole punch and electronic device stand of the embodiments of the present invention taken generally in the direction of Arrow 5 in FIG. 2.

As shown in FIG. 3, the supporting apparatus 130 includes the pair of proximal ends 36 of the pair of arms 33 of the handle 26 having a pair of slots 146, respectively.

The pair of slots 146 of the pair of proximal ends 36 of the pair of arms 33 of the handle 26 clippingly receive the pair of stoppers 44 of the supporting apparatus 130, respectively.

Specific Configuration of Each Stopper of the Pair of Stoppers 44 of the First Embodiment of the Supporting Apparatus 130

The specific configuration of each stopper 44 of the supporting apparatus 130 can best be seen in FIGS. 8-13, and as such, will be discussed with reference thereto.

Each stopper 44 of the supporting apparatus 130 is a block 148.

The block 148 of each stopper 44 of the supporting apparatus 130 is made from one of plastic and metal.

The block 148 of each stopper 44 of the supporting apparatus 130 has a gap 149. The gap 149 of the block 148 of each stopper 44 of the supporting apparatus 130 is for receiving a sheet of cardboard 149a for supporting a larger hand-held electronic device 149b (FIG. 1).

The block 148 of each stopper 44 of the supporting apparatus 130 further has a bottom surface 150, a top surface 152, a pair of side surfaces 154, a front surface 156, and a rear surface 158.

The bottom surface 150 of the block 148 of each stopper 44 of the supporting apparatus 130 is flat, substantially square-shaped, and abuts against the top surfaces 45 of the pair of proximal ends 36 of the pair of arms 33 of the handle 26, respectively.

The front surface 156 of the block 148 of each stopper 44 of the supporting apparatus 130 is flat, and substantially square-shaped.

The gap 149 of the block 148 of each stopper 44 of the supporting apparatus 130 is defined by a pair of surfaces 160.

The pair of surfaces 160 of the gap 149 of the block 148 of each stopper 44 of the supporting apparatus 130 are flat, and substantially rectangular-shaped.

An upper surface of the pair of surfaces 160 of the gap 149 of the block 148 of each stopper 44 of the supporting apparatus 130 is spaced above, and is parallel to, the pair of arms 33 of the handle 26, respectively.

The upper surface of the pair of surfaces 160 of the gap 149 of the block 148 of each stopper 44 of the supporting apparatus 130 is perpendicular to the front surface 156 of the block 148 of an associated stopper 44 of the supporting apparatus 130.

A rear surface of the pair of surfaces 160 of the gap 149 of the block 148 of each stopper 44 of the supporting apparatus 130 is perpendicular to the upper surface of the pair of surfaces of the gap 149 of the block 148 of an associated stopper 44 of the supporting apparatus 130.

The rear surface of the pair of surfaces 160 of the gap 149 of the block 148 of each stopper 44 of the supporting apparatus 130 is perpendicular to the bottom surface 150 of the block 148 of an associated stopper 44 of the supporting apparatus 130.

The rear surface of the pair of surfaces 160 of the gap 149 of the block 148 of the associated stopper 44 of the supporting apparatus 130 is spaced behind the front surface 156 of the block 148 of an associated stopper 44 of the supporting apparatus 130, so as to define the gap 149 of the block 148 of the associated stopper 44 of the supporting apparatus 130 as rectangular parallelepiped-shaped for receiving the sheet of cardboard 149a for supporting the larger hand-held electronic device 149b (FIG. 1).

The gap 149 of the block 148 of each stopper 44 of the supporting apparatus 130 is disposed where the front surface 156 of the block 148 of an associated stopper 44 of the supporting apparatus 130 meets the bottom surface 150 of the block 148 of the associated stopper 44 of the supporting apparatus 130.

The rear surface 158 of the block 148 of each stopper 44 of the supporting apparatus 130 is flat, is substantially rectangular-shaped, and is parallel to, and is spaced behind, the front surface 156 of the block 148 of an associated stopper 44 of the supporting apparatus 130.

The rear surface 158 of the block 148 of each stopper 44 of the supporting apparatus 130 is parallel to, and is spaced behind, the rear surface of the pair of surfaces 160 of the gap 149 of the block 148 of an associated stopper 44 of the supporting apparatus 130.

The rear surface 158 of the block 148 of each stopper 44 of the supporting apparatus 130 is perpendicular to the bottom surface 150 of the block 148 of an associated stopper 44 of the supporting apparatus 130.

The top surface 152 of the block 148 of each stopper 44 of the supporting apparatus 130 has a first portion 162 and a second portion 164.

The first portion 162 of the top surface 152 of the block 148 of each stopper 44 of the supporting apparatus 130 is flat, and is substantially rectangular-shaped.

The first portion 162 of the top surface 152 of the block 148 of each stopper 44 of the supporting apparatus 130 is spaced above, and is parallel to, the upper surface of the pair of surfaces of the gap 149 of the block 148 of an associated stopper 44 of the supporting apparatus 130.

The first portion 162 of the top surface 152 of the block 148 of each stopper 44 of the supporting apparatus 130 is spaced above, and is parallel to, the bottom surface 150 of the block 148 of an associated stopper 44 of the supporting apparatus 130.

The first portion 162 of the top surface 152 of the block 148 of each stopper 44 of the supporting apparatus 130 is perpendicular to the front surface 156 of the block 148 of an associated stopper 44 of the supporting apparatus 130.

The first portion 162 of the top surface 152 of the block 148 of each stopper 44 of the supporting apparatus 130 is spaced above, and is perpendicular to, the rear surface of the pair of surfaces 160 of the gap 149 of the block 148 of an associated stopper 44 of the supporting apparatus 130.

The first portion 162 of the top surface 152 of the block 148 of each stopper 44 of the supporting apparatus 130 is spaced in front of, and is perpendicular to, the rear surface 158 of the block 148 of an associated stopper 44 of the supporting apparatus 130.

The second portion 164 of the top surface 152 of the block 148 of each stopper 44 of the supporting apparatus 130 is flat, is substantially square-shaped, and extends skewly from the first portion 162 of the top surface 152 of the block 148 of an associated stopper 44 of the supporting apparatus 130 to the rear surface 158 of the block 148 of the associated stopper 44 of the supporting apparatus 130.

The pair of side surfaces 154 of the block 148 of each stopper 44 of the supporting apparatus 130 are flat, are spaced apart from each other, and are parallel to each other.

The pair of side surfaces 154 of the block 148 of each stopper 44 of the supporting apparatus 130 extend from, and are perpendicular to, the bottom surface 150 of the block 148 of an associated stopper 44 of the supporting apparatus 130, the top surface 152 of the block 148 of the associated stopper 44 of the supporting apparatus 130, the front surface 156 of the block 148 of the associated stopper 44 of the supporting apparatus 130, the rear surface 158 of the block 148 of the associated stopper 44 of the supporting apparatus 130, and the pair of surfaces 160 of the gap 149 of the block 148 of the associated stopper 44 of the supporting apparatus 130.

The block 148 of each stopper 44 of the supporting apparatus 130 further has a clip 166.

The clip 166 of the block 148 of each stopper 44 of the supporting apparatus 130 depends from the bottom surface 150 of the block 148 of an associated stopper 44 of the supporting apparatus 130, and is clippingly received by the pair of slots 146 of the pair of proximal ends 36 of the pair of arms 33 of the handle 26, respectively.

The clip 166 of the block 148 of each stopper 44 of the supporting apparatus 130 is slender and elongated to match that of the pair of slots 146 of the pair of proximal ends 36 of the pair of arms 33 of the handle 26, respectively, so as to prevent the block 148 of each stopper 44 of the supporting apparatus 130 from inadvertent rotation relative to the pair of arms 33 of the handle 26, respectively.

Specific Configuration of Each Stopper of the Pair of Stoppers 44 of the Second Embodiment of the Supporting Apparatus 230

Figure 14:
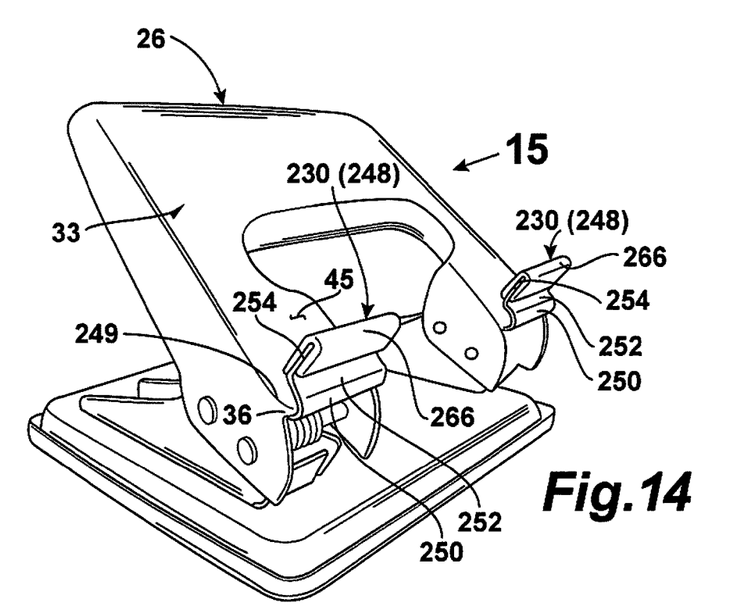
FIG. 14 is diagrammatic perspective view of a second embodiment of the combination hole punch and electronic device stand of the embodiments of the present invention per se.
Figure 15:
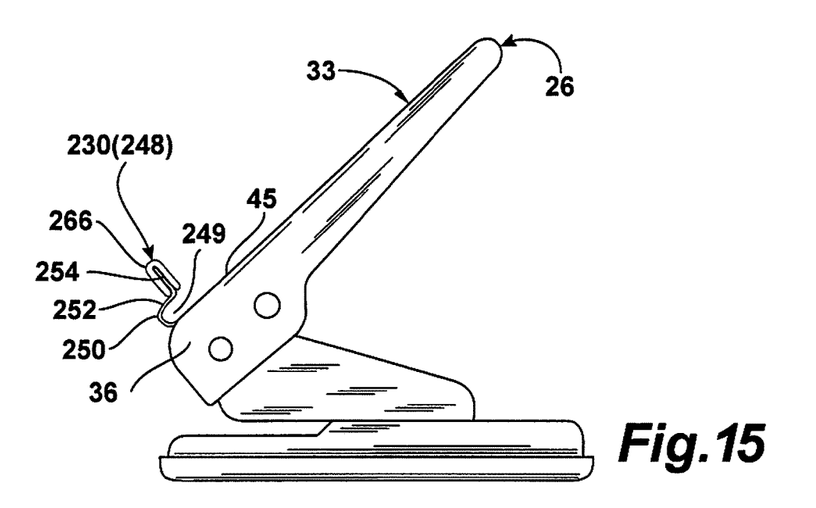
FIG. 15 is a diagrammatic side elevational view of the combination hole punch and electronic device stand of the embodiments of the present invention taken generally in the direction of Arrow 15 in FIG. 14.

The specific configuration of each stopper 44 of the supporting apparatus 230 can best be seen in FIGS. 14 and 15, and as such, will be discussed with reference thereto.

Each stopper 44 of the supporting apparatus 230 is an upward extension 248 of an associated top surface 45 of an associated proximal end 36 of an associated arm 33 of the handle 26.

The extensions 248 of the pair of stoppers 44 of the supporting apparatus 230, respectively, are made from one of plastic and metal.

The extensions 248 of the pair of stoppers 44 of the supporting apparatus 230 have gaps 249, respectively. The gaps 249 of the extensions 248 of the pair of stoppers 44 of the supporting apparatus 230, respectively, are for functioning in the same way as the gap 149 of the block 148 of each stopper 44 of the supporting apparatus 130 does by receiving the sheet of cardboard 149a for supporting the larger hand-held electronic device 149b (FIG. 1).

Each extension 248 of the pair of stoppers 44 of the supporting apparatus 230 further has a first portion 250, a second portion 252, and a third portion 254.

The first portion 250 of each extension 248 of the pair of stoppers 44 of the supporting apparatus 230 bends upwardly from, and is perpendicular to, an associated top surface 45 of an associated proximal end 36 of an associated arm 33 of the handle 26.

The second portion 252 of each extension 248 of the pair of stoppers 44 of the supporting apparatus 230 bends rearwardly from, and is perpendicular to, the first portion 250 of an associated extension 248 of the pair of stoppers 44 of the supporting apparatus 230.

The second portion 252 of each extension 248 of the pair of stoppers 44 of the supporting apparatus 230 is parallel to an associated top surface 45 of an associated proximal end 36 of an associated arm 33 of the handle 26.

The third portion 254 of each extension 248 of the pair of stoppers 44 of the supporting apparatus 230 extends upwardly from, and is perpendicular to, the second portion 252 of an associated extension 248 of an associated stopper 44 of the supporting apparatus 230.

The gap 249 of each extension 248 of the pair of stoppers 44 of the supporting apparatus 230 is defined by an associated top surface 45 of an associated proximal end 36 of an associated arm 33 of the handle 26, the first portion 250 of an associated extension 248 of an associated stopper 44 of the supporting apparatus 230, and the second portion 252 of the associated extension 248 of the associated stopper 44 of the supporting apparatus 230.

Each extension 248 of the pair of stoppers 44 of the supporting apparatus 230 further has a protective covering 266.

The protective covering 266 of each extension 248 of the pair of stoppers 44 of the supporting apparatus 230 covers the third portion 254 of an associated extension 248 of an associated stopper 44 of the supporting apparatus 230.

Impressions

It will be understood that each of the elements described above, or two or more together, may also find a useful application in other types of constructions differing from the types described above.

While the invention has been illustrated and described as embodiments of a combination hole punch and electronic device stand, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A double duty hole punch for punching holes in paper and for supporting a hand-held electronic device thereon, comprising:
 a) a base;
 b) a handle;
 c) a pair of punch dies; and
 d) means for supporting the hand-held electronic device;
 wherein said base is for resting on a horizontal surface;
 wherein said handle is pivotally attached to said base;
 wherein said pair of punch dies are operatively connected to said handle;
 wherein said pair of punch dies are for punching the holes in the paper;
 wherein said base includes a pair of pedestals;
 wherein said pair of pedestals of said base extend upwardly therefrom;

wherein said handle is U-shaped;
wherein said handle has a pair of arms;
wherein said handle has a cross-piece;
wherein said pair of arms of said handle have a pair of proximal ends, respectively;
wherein said pair of arms of said handle have a pair of distal ends, respectively;
wherein said cross-piece of said handle extends from said distal end of one arm of said handle to said distal end of the other arm of said handle;
wherein said pair of proximal ends of said handle are pivotally attached to said pair of pedestals of said base, respectively;
wherein said pair of punch dies include a pair of punch rods, respectively;
wherein said pair of punch dies include a pair of springs, respectively;
wherein said pair of springs of said pair of punch dies surround said pair of punch rods of said pair of punch dies, respectively;
wherein said pair of springs of said pair of punch dies bias said handle upwardly in a non-punch position, and when said handle is pressed downwardly against biasing of said pair of springs of said pair of punch dies into a punch position, said pair of punch rods of said pair of punch dies are lowered and punch the holes in the paper;
wherein said means includes a pair of stoppers;
wherein said pair of stoppers of said means are for providing stops for the hand-held electronic device when the hand-held electronic device rests on said handle;
wherein said pair of stoppers of said means are disposed at said pair of proximal ends of said pair of arms of said handle, respectively;
wherein said means includes top surfaces of said pair of proximal ends of said pair of arms of said handle having one slot on each respective proximal end of the handle.

2. The double duty hole punch of claim 1, wherein each slot on said pair of proximal ends of said pair of arms of said handle of said means clippingly receive said pair of stoppers of said means, respectively.

3. The double duty hole punch of claim 2, wherein each stopper of said means is a block.

4. The double duty hole punch of claim 3, wherein said block of each stopper of said means is made from one of plastic and metal.

5. The double duty hole punch of claim 4, wherein said block of each stopper of said means has a gap;
wherein said gap of said block of each stopper of said means is for receiving a sheet of cardboard; and
wherein the sheet of cardboard is for supporting a larger hand-held electronic device.

6. The double duty hole punch of claim 5, wherein said block of each stopper of said means has a bottom surface.

7. The double duty hole punch of claim 6, wherein said block of each stopper of said means has a top surface.

8. The double duty hole punch of claim 7, wherein said block of each stopper of said means has a pair of side surfaces.

9. The double duty hole punch of claim 8, wherein said block of each stopper of said means has a front surface.

10. The double duty hole punch of claim 9, wherein said block of each stopper of said means has a rear surface.

11. The double duty hole punch of claim 10, wherein said bottom surface of said block of each stopper of said means is substantially square-shaped.

12. The double duty hole punch of claim 11, wherein said bottom surface of said block of each stopper of said means abuts against said top surfaces of said pair of proximal ends of said pair of arms of said handle, respectively.

13. The double duty hole punch of claim 12, wherein said front surface of said block of each stopper of said means is flat.

14. The double duty hole punch of claim 13, wherein said front surface of said block of each stopper of said means is substantially square-shaped.

15. The double duty hole punch of claim 14, wherein said gap of said block of each stopper of said means is defined by a pair of surfaces.

16. The double duty hole punch of claim 15, wherein said pair of surfaces of said gap of said block of each stopper of said means are flat.

17. The double duty hole punch of claim 16, wherein said pair of surfaces of said gap of said block of each stopper of said means are substantially rectangular-shaped.

18. The double duty hole punch of claim 17, wherein an upper surface of said pair of surfaces of said gap of said block of each stopper of said means is parallel to said pair of arms of said handle, respectively.

19. The double duty hole punch of claim 18, wherein said upper surface of said pair of surfaces of said gap of said block of each stopper of said means is spaced above said pair of arms of said handle, respectively.

20. The double duty hole punch of claim 19, wherein said upper surface of said pair of surfaces of said gap of said block of each stopper of said means is perpendicular to said front surface of said block of an associated stopper of said means.

21. The double duty hole punch of claim 20, wherein a rear surface of said pair of surfaces of said gap of said block of each stopper of said means is perpendicular to said upper surface of said pair of surfaces of said gap of said block of an associated stopper of said means.

22. The double duty hole punch of claim 21, wherein said rear surface of said pair of surfaces of said gap of said block of each stopper of said means is perpendicular to said bottom surface of said block of an associated stopper of said means.

23. The double duty hole punch of claim 22, wherein said rear surface of said pair of surfaces of said gap of said block of each stopper of said means is spaced behind said front surface of said block of an associated stopper of said means.

24. The double duty hole punch of claim 23, wherein said gap of said block of each stopper of said means is rectangular parallelepiped-shaped for receiving the sheet of cardboard for supporting the larger hand-held electronic device.

25. The double duty hole punch of claim 24, wherein said gap of said block of each stopper of said means is disposed where said front surface of said block of an associated stopper of said means meets said bottom surface of said block of said associated stopper of said means.

26. The double duty hole punch of claim 25, wherein said rear surface of said block of each stopper of said means is flat.

27. The double duty hole punch of claim 26, wherein said rear surface of said block of each stopper of said means is substantially rectangular-shaped.

28. The double duty hole punch of claim 27, wherein said rear surface of said block of each stopper of said means is parallel to said front surface of said block of an associated stopper of said means.

29. The double duty hole punch of claim 28, wherein said rear surface of said block of each stopper of said means is spaced behind said front surface of said block of an associated stopper of said means.

30. The double duty hole punch of claim 29, wherein said rear surface of said block of each stopper of said means is parallel to said rear surface of said pair of surfaces of said gap of said block of an associated stopper of said means.

31. The double duty hole punch of claim 30, wherein said rear surface of said block of each stopper of said means is spaced behind said rear surface of said pair of surfaces of said gap of said block of an associated stopper of said means.

32. The double duty hole punch of claim 31, wherein said rear surface of said block of each stopper of said means is perpendicular to said bottom surface of said block of an associated stopper of said means.

33. The double duty hole punch of claim 32, wherein said top surface of said block of each stopper of said means has a first portion.

34. The double duty hole punch of claim 33, wherein said top surface of said block of each stopper of said means has a second portion.

35. The double duty hole punch of claim 34, wherein said first portion of said top surface of said block of each stopper of said means is flat.

36. The double duty hole punch of claim 35, wherein said first portion of said top surface of said block of each stopper of said means is substantially rectangular-shaped.

37. The double duty hole punch of claim 36, wherein said first portion of said top surface of said block of each stopper of said means is spaced above said upper surface of said pair of surfaces of said gap of said block of an associated stopper of said means.

38. The double duty hole punch of claim 37, wherein said first portion of said top surface of said block of each stopper of said means is parallel to said upper surface of said pair of surfaces of said gap of said block of an associated stopper of said means.

39. The double duty hole punch of claim 38, wherein said first portion of said top surface of said block of each stopper of said means is parallel to said bottom surface of said block of an associated stopper of said means.

40. The double duty hole punch of claim 39, wherein said first portion of said top surface of said block of each stopper of said means is perpendicular to said front surface of said block of an associated stopper of said means.

41. The double duty hole punch of claim 40, wherein said first portion of said top surface of said block of each stopper of said means is spaced above said rear surface of said pair of surfaces of said gap of said block of an associated stopper of said means.

42. The double duty hole punch of claim 41, wherein said first portion of said top surface of said block of each stopper of said means is perpendicular to said rear surface of said pair of surfaces of said gap of said block of an associated stopper of said means.

43. The double duty hole punch of claim 42, wherein said first portion of said top surface of said block of each stopper of said means is spaced in front of said rear surface of said block of an associated stopper of said means.

44. The double duty hole punch of claim 43, wherein said first portion of said top surface of said block of each stopper of said means is perpendicular to said rear surface of said block of an associated stopper of said means.

45. The double duty hole punch of claim 44, wherein said second portion of said top surface of said block of each stopper of said means is flat.

46. The double duty hole punch of claim 45, wherein said second portion of said top surface of said block of each stopper of said means is substantially square-shaped.

47. The double duty hole punch of claim 46, wherein said second portion of said top surface of said block of each stopper of said means extends at an angle with respect to said first portion of said top surface of said block of an associated stopper of said means to said rear surface of said block of said associated stopper of said means.

48. The double duty hole punch of claim 47, wherein said pair of side surfaces of said block of each stopper of said means are flat.

49. The double duty hole punch of claim 48, wherein said pair of side surfaces of said block of each stopper of said means are spaced-apart from each other.

50. The double duty hole punch of claim 49, wherein said pair of side surfaces of said block of each stopper of said means are parallel to each other.

51. The double duty hole punch of claim 50, wherein said pair of side surfaces of said block of each stopper of said means extend from said bottom surface of said block of an associated stopper of said means.

52. The double duty hole punch of claim 51, wherein said pair of side surfaces of said block of each stopper of said means extend from said top surface of said block of an associated stopper of said means.

53. The double duty hole punch of claim 52, wherein said pair of side surfaces of said block of each stopper of said means extend from said front surface of said block of an associated stopper of said means.

54. The double duty hole punch of claim 53, wherein said pair of side surfaces of said block of each stopper of said means extend from said rear surface of said block of an associated stopper of said means.

55. The double duty hole punch of claim 54, wherein said pair of side surfaces of said block of each stopper of said means extend from said pair of surfaces of said gap of said block of an associated stopper of said means.

56. The double duty hole punch of claim 55, wherein said pair of side surfaces of said block of each stopper of said means are perpendicular to said bottom surface of said block of an associated stopper of said means.

57. The double duty hole punch of claim 56, wherein said pair of side surfaces of said block of each stopper of said means are perpendicular to said top surface of said block of an associated stopper of said means.

58. The double duty hole punch of claim 57, wherein said pair of side surfaces of said block of each stopper of said means are perpendicular to said front surface of said block of an associated stopper of said means.

59. The double duty hole punch of claim 58, wherein said pair of side surfaces of said block of each stopper of said means are perpendicular to said rear surface of said block of an associated stopper of said means.

60. The double duty hole punch of claim 59, wherein said pair of side surfaces of said block of each stopper of said means are perpendicular to said pair of surfaces of said gap of said block of an associated stopper of said means.

61. The double duty hole punch of claim 60, wherein said block of each stopper of said supporting apparatus has a clip.

62. The double duty hole punch of claim 61, wherein said clip of said block of each stopper of said means depends from said bottom surface of said block of an associated stopper of said means.

63. The double duty hole punch of claim 62, wherein said clip of said block of each stopper of said means is clippingly received by said pair of slots of said pair of proximal ends of said pair of arms of said handle, respectively.

64. The double duty hole punch of claim 63, wherein said clip of said block of each stopper of said means is slender and elongated to match that of said pair of slots of said pair of proximal ends of said pair of arms of said handle, respectively, so as to prevent said block of an associated stopper of said means from inadvertent rotation relative to said pair of arms of said handle, respectively.

65. An improved double duty hole punch for punching holes in paper and for supporting a hand-held electronic device thereon and having a base for resting on a horizontal surface, a handle pivotally attached to the base, and a pair of punch dies operatively connected to the handle and for punching the holes in the paper, wherein said improvement comprises:
means for supporting the hand-held electronic device;
wherein said improvement comprises:
a) said means including a pair of stoppers; and
b) said pair of stoppers of said means being for providing stops for the hand-held electronic device when the hand-held electronic device rests on the handle;
wherein said improvement comprises said pair of stoppers of said means being disposed at a pair of proximal ends of a pair of arms of the handle, respectively;
wherein said improvement comprises said means including top surfaces of the pair of proximal ends of the pair of arms of the handle having one slot on each respective end of the handle.

66. The improved double duty hole punch of claim 65, wherein said improvement comprises each slot on the pair of proximal ends of the pair of arms of the handle clippingly receiving said pair of stoppers of said means, respectively.

67. The improved double duty hole punch of claim 66, wherein said improvement comprises each stopper of said means being a block.

68. The improved double duty hole punch of claim 67, wherein said improvement comprises said block of each stopper of said means being made from one of plastic and metal.

69. The double duty hole punch of claim 68, wherein said improvement comprises said block of each stopper of said means having a gap;
wherein said gap of said block of each stopper of said means is for receiving a sheet of cardboard; and
wherein the sheet of cardboard is for supporting a larger hand-held electronic device.

70. The improved double duty hole punch of claim 69, wherein said improvement comprises said block of each stopper of said means having a bottom surface.

71. The improved double duty hole punch of claim 70, wherein said improvement comprises said block of each stopper of said means having a top surface.

72. The improved double duty hole punch of claim 71, wherein said improvement comprises said block of each stopper of said means having a pair of side surfaces.

73. The improved double duty hole punch of claim 72, wherein said improvement comprises said block of each stopper of said means having a front surface.

74. The improved double duty hole punch of claim 73, wherein said improvement comprises said block of each stopper of said means having a rear surface.

75. The improved double duty hole punch of claim 74, wherein said improvement comprises said bottom surface of said block of each stopper of said means being flat.

76. The improved double duty hole punch of claim 75, wherein said improvement comprises said bottom surface of said block of each stopper of said means being substantially square-shaped.

77. The improved double duty hole punch of claim 76, wherein said improvement comprises said bottom surface of said block of each stopper of said means abutting against the top surfaces of the pair of proximal ends of the pair of arms of the handle, respectively.

78. The improved double duty hole punch of claim 77, wherein said improvement comprises said front surface of said block of each stopper of said means being flat.

79. The improved double duty hole punch of claim 78, wherein said improvement comprises said front surface of said block of each stopper of said means being substantially square-shaped.

80. The improved double duty hole punch of claim 79, wherein said improvement comprises said gap of said block of each stopper of said means being defined by a pair of surfaces.

81. The improved double duty hole punch of claim 80, wherein said improvement comprises said pair of surfaces of said gap of said block of each stopper of said means being flat.

82. The improved double duty hole punch of claim 81, wherein said improvement comprises said pair of surfaces of said gap of said block of each stopper of said means being substantially rectangular-shaped.

83. The improved double duty hole punch of claim 82, wherein said improvement comprises an upper surface of said pair of surfaces of said gap of said block of each stopper of said means being parallel to the pair of arms of the handle, respectively.

84. The improved double duty hole punch of claim 83, wherein said improvement comprises said upper surface of said pair of surfaces of said gap of said block of each stopper of said means being spaced above the pair of arms of the handle, respectively.

85. The improved double duty hole punch of claim 84, wherein said improvement comprises said upper surface of said pair of surfaces of said gap of said block of each stopper of said means being perpendicular to said front surface of said block of an associated stopper of said means.

86. The improved double duty hole punch of claim 85, wherein said improvement comprises a rear surface of said pair of surfaces of said gap of said block of each stopper of said means being perpendicular to said upper surface of said pair of surfaces of said gap of said block of an associated stopper of said means.

87. The improved double duty hole punch of claim 86, wherein said improvement comprises said rear surface of said pair of surfaces of said gap of said block of each stopper of said means being perpendicular to said bottom surface of said block of an associated stopper of said means.

88. The improved double duty hole punch of claim 87, wherein said improvement comprises said rear surface of said pair of surfaces of said gap of said block of each stopper of said means being spaced behind said front surface of said block of an associated stopper of said means.

89. The improved double duty hole punch of claim 88, wherein said improvement comprises said gap of said block of each stopper of said means being rectangular parallelepiped-shaped for receiving the sheet of cardboard for supporting the larger hand-held electronic device.

90. The improved double duty hole punch of claim 89, wherein said improvement comprises said gap of said block of each stopper of said means being disposed where said front surface of said block of an associated stopper of said means meets said bottom surface of said block of said associated stopper of said means.

91. The improved double duty hole punch of claim 90, wherein said improvement comprises said rear surface of said block of each stopper of said means being flat.

92. The improved double duty hole punch of claim 91, wherein said improvement comprises said rear surface of said block of each stopper of said means being substantially rectangular-shaped.

93. The improved double duty hole punch of claim 92, wherein said improvement comprises said rear surface of said block of each stopper of said means being parallel to said front surface of said block of an associated stopper of said means.

94. The improved double duty hole punch of claim 93, wherein said improvement comprises said rear surface of said block of each stopper of said means being spaced behind said front surface of said block of an associated stopper of said means.

95. The improved double duty hole punch of claim 94, wherein said improvement comprises said rear surface of said block of each stopper of said means being parallel to said rear surface of said pair of surfaces of said gap of said block of an associated stopper of said means.

96. The improved double duty hole punch of claim 95, wherein said improvement comprises said rear surface of said block of each stopper of said means being spaced behind said rear surface of said pair of surfaces of said gap of said block of an associated stopper of said means.

97. The improved double duty hole punch of claim 96, wherein said improvement comprises said rear surface of said block of each stopper of said means being perpendicular to said bottom surface of said block of an associated stopper of said means.

98. The improved double duty hole punch of claim 97, wherein said improvement comprises said top surface of said block of each stopper of said means having a first portion.

99. The improved double duty hole punch of claim 98, wherein said improvement comprises said top surface of said block of each stopper of said means having a second portion.

100. The improved double duty hole punch of claim 99, wherein said improvement comprises said first portion of said top surface of said block of each stopper of said means being flat.

101. The improved double duty hole punch of claim 100, wherein said improvement comprises said first portion of said top surface of said block of each stopper of said means being substantially rectangular-shaped.

102. The improved double duty hole punch of claim 101, wherein said improvement comprises said first portion of said top surface of said block of each stopper of said means being spaced above said upper surface of said pair of surfaces of said gap of said block of an associated stopper of said means.

103. The improved double duty hole punch of claim 102, wherein said improvement comprises said first portion of said top surface of said block of each stopper of said means being parallel to said upper surface of said pair of surfaces of said gap of said block of an associated stopper of said means.

104. The improved double duty hole punch of claim 103, wherein said improvement comprises said first portion of said top surface of said block of each stopper of said means being parallel to said bottom surface of said block of an associated stopper of said means.

105. The improved double duty hole punch of claim 104, wherein said improvement comprises said first portion of said top surface of said block of each stopper of said means being perpendicular to said front surface of said block of an associated stopper of said means.

106. The improved double duty hole punch of claim 105, wherein said improvement comprises said first portion of said top surface of said block of each stopper of said means being spaced above said rear surface of said pair of surfaces of said gap of said block of an associated stopper of said means.

107. The improved double duty hole punch of claim 106, wherein said improvement comprises said first portion of said top surface of said block of each stopper of said means being perpendicular to said rear surface of said pair of surfaces of said gap of said block of an associated stopper of said means.

108. The improved double duty hole punch of claim 107, wherein said improvement comprises said first portion of said top surface of said block of each stopper of said means being spaced in front of said rear surface of said block of an associated stopper of said means.

109. The improved double duty hole punch of claim 108, wherein said improvement comprises said first portion of said top surface of said block of each stopper of said means being perpendicular to said rear surface of said block of an associated stopper of said means.

110. The improved double duty hole punch of claim 109, wherein said improvement comprises said second portion of said top surface of said block of each stopper of said means being flat.

111. The improved double duty hole punch of claim 110, wherein said improvement comprises said second portion of said top surface of said block of each stopper of said means being substantially square-shaped.

112. The improved double duty hole punch of claim 111, wherein said improvement comprises said second portion of said top surface of said block of each stopper of said means extending at an angle with respect to said first portion of said top surface of said block of an associated stopper of said means to said rear surface of said block of said associated stopper of said means.

113. The improved double duty hole punch of claim 112, wherein said improvement comprises said pair of side surfaces of said block of each stopper of said means being flat.

114. The improved double duty hole punch of claim 113, wherein said improvement comprises said pair of side surfaces of said block of each stopper of said means being spaced-apart from each other.

115. The improved double duty hole punch of claim 114, wherein said improvement comprises said pair of side surfaces of said block of each stopper of said means being parallel to each other.

116. The improved double duty hole punch of claim 115, wherein said improvement comprises said pair of side surfaces of said block of each stopper of said means extending from said bottom surface of said block of an associated stopper of said means.

117. The improved double duty hole punch of claim 116, wherein said improvement comprises said pair of side surfaces of said block of each stopper of said means extending from said top surface of said block of an associated stopper of said means.

118. The improved double duty hole punch of claim 117, wherein said improvement comprises said pair of side surfaces of said block of each stopper of said means extending from said front surface of said block of an associated stopper of said means.

119. The improved double duty hole punch of claim 118, wherein said improvement comprises said pair of side surfaces of said block of each stopper of said means extending from said rear surface of said block of an associated stopper of said means.

120. The improved double duty hole punch of claim 119, wherein said improvement comprises said pair of side surfaces of said block of each stopper of said means extending from said pair of surfaces of said gap of said block of an associated stopper of said means.

121. The improved double duty hole punch of claim 120, wherein said improvement comprises said pair of side surfaces of said block of each stopper of said means being perpendicular to said bottom surface of said block of an associated stopper of said means.

122. The improved double duty hole punch of claim 121, wherein said improvement comprises said pair of side surfaces of said block of each stopper of said means being perpendicular to said top surface of said block of an associated stopper of said means.

123. The improved double duty hole punch of claim 122, wherein said pair of side surfaces of said block of each stopper of said means being perpendicular to said front surface of said block of an associated stopper of said means.

124. The improved double duty hole punch of claim 123, wherein said improvement comprises said pair of side surfaces of said block of each stopper of said means being perpendicular to said rear surface of said block of an associated stopper of said means.

125. The improved double duty hole punch of claim 124, wherein said improvement comprises said pair of side surfaces of said block of each stopper of said means being perpendicular to said pair of surfaces of said gap of said block of an associated stopper of said means.

126. The improved double duty hole punch of claim 125, wherein said improvement comprises said block of each stopper of said means having a clip.

127. The improved double duty hole punch of claim 126, wherein said improvement comprises said clip of said block of each stopper of said means depending from said bottom surface of said block of an associated stopper of said means.

128. The improved double duty hole punch of claim 127, wherein said improvement comprises said clip of said block of each stopper of said means being clippingly received by said pair of slots of the pair of proximal ends of the pair of arms of the handle, respectively.

129. The improved double duty hole punch of claim 128, wherein said improvement comprises said clip of said block of each stopper of said means being slender and elongated to match that of said pair of slots of the pair of proximal ends of the pair of arms of the handle, respectively, so as to prevent said block of each stopper of said means from inadvertent rotation relative to the pair of arms of the handle, respectively.

* * * * *